(12) United States Patent  
Liu

(10) Patent No.: US 12,374,686 B2  
(45) Date of Patent: Jul. 29, 2025

(54) ELECTROCHEMICAL APPARATUS AND ELECTRONIC APPARATUS CONTAINING THE ELECTROCHEMICAL APPARATUS

(71) Applicant: Ningde Amperex Technology Limited, Fujian (CN)

(72) Inventor: Xiaojing Liu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 621 days.

(21) Appl. No.: 17/699,555

(22) Filed: Mar. 21, 2022

(65) Prior Publication Data

US 2022/0223849 A1 Jul. 14, 2022

Related U.S. Application Data

(63) Continuation of application No. PCT/CN2020/087515, filed on Apr. 28, 2020.

(51) Int. Cl.
*H01M 4/00* (2006.01)
*H01M 4/38* (2006.01)
(Continued)

(52) U.S. Cl.
CPC ....... *H01M 4/386* (2013.01); *H01M 10/0587* (2013.01); *H01M 2004/027* (2013.01); *H01M 2004/028* (2013.01)

(58) Field of Classification Search
CPC .......... H01M 4/386; H01M 2004/027; H01M 10/0587; Y02E 60/10
See application file for complete search history.

(56) References Cited

U.S. PATENT DOCUMENTS

2018/0026298 A1  1/2018  Hasegawa et al.
2019/0044124 A1  2/2019  Kawate
(Continued)

FOREIGN PATENT DOCUMENTS

CN  1949580 A    4/2007
CN  203733894 U  7/2014
(Continued)

OTHER PUBLICATIONS

Takano, Wound Element for Nonaqueous Electrolyte Secondary Battery, and Nonaqueous Electrolyte Secondary Battery, Jul. 2016, See the Abstract. (Year: 2016).*

(Continued)

*Primary Examiner* — Anca Eoff
*Assistant Examiner* — Monique M Wills
(74) *Attorney, Agent, or Firm* — Maier & Maier, PLLC

(57) ABSTRACT

An electrochemical apparatus includes a positive electrode, a separator and a negative electrode. The negative electrode includes a negative current collector, a negative active material layer and a negative tab, and the negative tab is arranged on a side edge of a long axis of the negative current collector and is in contact with the negative active material layer. The negative active material layer includes a silicon-based material, a distance between a central position of the negative tab and either end of the negative active material layer in a long axis direction is a first length, a length of a long axis of the negative active material layer is a second length, and $0.5 \geq D \geq 0.6 \times G$, where D is a ratio of the first length to the second length, G is a weight percentage of the silicon-based material. The weight percentage of the silicon-based material is less than or equal to 70%.

14 Claims, 5 Drawing Sheets

(51) Int. Cl.
H01M 10/0587 (2010.01)
H01M 4/02 (2006.01)

(56) References Cited

U.S. PATENT DOCUMENTS

| | | | |
|---|---|---|---|
| 2019/0207212 A1 | 7/2019 | Li | |
| 2020/0044234 A1 | 2/2020 | Zeng et al. | |

FOREIGN PATENT DOCUMENTS

| | | | |
|---|---|---|---|
| CN | 204809314 U | 11/2015 | |
| CN | 105336984 A | 2/2016 | |
| CN | 205828514 U | 12/2016 | |
| CN | 205828573 U | 12/2016 | |
| CN | 107293805 A | 10/2017 | |
| CN | 107834014 A | 3/2018 | |
| CN | 207303263 U | 5/2018 | |
| CN | 207303603 U | 5/2018 | |
| CN | 207459051 U | 6/2018 | |
| CN | 207602716 U | 7/2018 | |
| CN | 109524606 A | 3/2019 | |
| CN | 110459730 A | 11/2019 | |
| CN | 110753674 A | 2/2020 | |
| CN | 111029527 A | 4/2020 | |
| JP | 2000077055 A | 3/2000 | |
| JP | 2000106167 A | 4/2000 | |
| JP | 2006032052 A | 2/2006 | |
| JP | 2009163929 A | 7/2009 | |
| JP | 2012084412 A | 4/2012 | |
| JP | 2012190738 A | 10/2012 | |
| JP | 2014225326 A | 12/2014 | |
| JP | 2016018654 A | 2/2016 | |
| JP | 2016122628 A * | 7/2016 | ............. Y02E 60/10 |
| JP | 2017059402 A | 3/2017 | |
| JP | 2018018646 A | 2/2018 | |
| JP | 2019046592 A | 3/2019 | |

OTHER PUBLICATIONS

Extended European Search Report for EP Application No. 20933746.8, dated Jul. 4, 2023.
First Office Action of CA application No. 3,164,572, dated Jul. 25, 2023.
First Office Action of JP application No. 2022543155, dated Sep. 5, 2023.
First Office Action of IN application No. 202227044389, dated Dec. 12, 2022.
Supplementary Search Report for CN Application No. 202010349336.4, dated Mar. 30, 2023.
ISR for International Application PCT/CN2020/087515 issued Feb. 3, 2021.
Chinese First OA for counterpart application 202010349336.4 dated Jan. 8, 2021.
Chinese Second OA for counterpart application 202010349336.4 dated Nov. 17, 2021.
First Office Action of CN application No. 202210526079.6, dated Apr. 19, 2024.
Second Office Action of JP application No. 2022-543155, dated Mar. 12, 2024.
Notice of allowance of JP application No. 2022-543155, dated Oct. 1, 2024.
Second Office Action of JP application No. 2022-543155, dated Mar. 12, 2024, with translation.
Notice of allowance of JP application No. 2022-543155, dated Oct. 1, 2024, with translation.

* cited by examiner

ELECTROCHEMICAL APPARATUS AND ELECTRONIC APPARATUS CONTAINING THE ELECTROCHEMICAL APPARATUS

CROSS-REFERENCE TO RELATED APPLICATIONS

This application is a continuation of International Patent Application No. PCT/CN2020/087515, filed on Apr. 28, 2020, the disclosure of which is hereby incorporated by reference in its entirety.

TECHNICAL FIELD

This application relates to the field of energy storage technologies, and in particular, to a negative electrode structure and an electrochemical apparatus and an electronic apparatus containing the negative electrode structure.

BACKGROUND

With the rapid development of mobile electronic technologies, people are using mobile electronic apparatuses such as mobile phones, tablet computers, notebook computers, and unmanned aerial vehicles more and more frequently with increasingly higher requirements. Therefore, an electrochemical apparatus (for example, a lithium-ion battery) that provides energy for the electronic apparatuses need to have higher energy density, large rate, higher safety, and less capacity attenuation after repeated charging and discharging processes.

The energy density and cycle efficiency of the electrochemical apparatuses are closely related to negative electrode materials thereof. At present, since a silicon-based material of at least one of a silicon-based elementary substance, a silicon-based alloy or a compound thereof has a high theoretical gram capacity, silicon-based materials in place of existing graphite materials are being widely studied. However, a silicon-based material itself has the problems of too low electrical conductivity and too high high-temperature expansion rate. Therefore, it is necessary to make further improvement and optimization on the structure of a negative electrode made of a negative electrode material containing the silicon-based material.

SUMMARY

This application provides an electrochemical apparatus and an electronic apparatus including the electrochemical apparatus in an attempt to solve, at least to some extent, at least one problem existing in the related art.

According to one aspect of this application, this application provides an electrochemical apparatus, including: a positive electrode, a separator, and a negative electrode. The negative electrode includes: a negative current collector, a negative active material layer, and a negative tab. The negative active material layer contains a silicon-based material, the negative tab is arranged on a side edge of a long axis of the negative current collector and is in contact with the negative active material layer, the negative tab is arranged on the side edge of the long axis of the negative current collector, a distance between a central position of the negative tab and either end of the negative active material layer in a long axis direction is a first length, a length of a long axis of the negative active material layer is a second length, and the negative electrode satisfies the following relationship formula (I):

$$0.5 \geq D \geq 0.6 \times G \qquad \text{formula (I)}$$

where D is a ratio of the first length to the second length, G is a weight percentage of the silicon-based material, and the weight percentage of the silicon-based material is less than or equal to 70%.

The electrochemical apparatus of this application uses the negative tab satisfying the above configuration, which can effectively reduce the impedance of the negative electrode and control the temperature rise of a battery cell, thereby reducing the cycling expansion rate of the electrochemical apparatus and improving the cycle performance thereof.

According to another aspect of this application, this application provides an electronic apparatus, and the electronic apparatus includes the foregoing electrochemical apparatus.

Additional aspects and advantages of the embodiments of the application are partially described and presented in the later description, or explained by implementation of the embodiments of the application.

BRIEF DESCRIPTION OF DRAWINGS

The following briefly illustrates the accompanying drawings for describing the embodiments of this application or necessary to the prior art so as to describe the embodiments of this application. Apparently, the accompanying drawings in the following description show merely some embodiments of this application. A person skilled in the art may still derive drawings of other embodiments according to the structures shown in these accompanying drawings without creative efforts.

DETAILED DESCRIPTION

Figure 1:
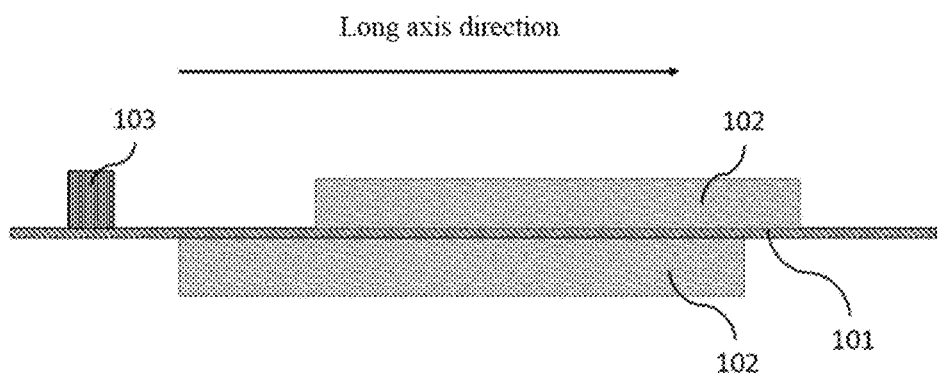
FIG. 1 is a cross-sectional view of a negative electrode structure according to the prior art.

Embodiments of this application will be described in detail below. In the full specification of this application, identical or similar components, as well as components having identical or similar functions, are denoted by like reference numerals. The embodiments described herein with respect to the accompanying drawings are illustrative and graphical, and are used to provide a basic understanding of this application. The embodiments of this application shall not be construed as a limitation on this application.

The terms "roughly", "generally", "substantially" and "approximately" used herein are intended to describe and represent small variations. When used in combination with an event or a circumstance, the term may refer to an example in which the exact event or circumstance occurs or an example in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference between two values is less than or equal to ±10% of an average value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may then be considered to be "generally" identical.

In this specification, unless specified or limited otherwise, the terms of relativity, such as "central", "longitudinal", "lateral", "front", "rear", "right", "left", "inner", "outer", "relatively low", "relatively high", "horizontal", "vertical", "higher than", "lower than", "upper", "lower", "top", "bottom" and derivative terms thereof (for example, "horizontally", "downward", "upward", etc.), shall be construed as referring to the directions described in discussion or shown in the drawings. These terms of relativity are merely used for descriptive convenience, and do not require the construction or operation of this application in a particular direction.

In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range were clearly designated.

In the description of embodiments and claims, a list of items preceded by the terms such as "at least one of", "at least one type of" or other similar terms may mean any combination of the listed items. For example, if items A and B are listed, the phrase "at least one of A and B" means only A, only B, or A and B. In another embodiment, if items A, B, and C are listed, the phrase "at least one of A, B, and C" means only A, only B, only C, A and B (excluding C), A and C (excluding B), B and C (excluding A), or all of A, B, and C. The item A may contain one element or a plurality of elements. The item B may contain one element or a plurality of elements. The item C may contain one element or a plurality of elements.

A silicon-based material itself has a semiconductor property. Since the powder conductivity of the silicon-based material is much smaller than that of the existing graphite material, the impedance of a negative electrode material including the silicon-based material, regardless of electrons or ions, is large. In the charging and discharging cycle process, especially under the high-rate charging and discharging condition, the internal impedance of a battery cell containing the silicon-based material is high, so that energy consumption for heat generation of the battery cell is increased, and the temperature rise of the battery cell is very obvious, which causes the degradation of electrochemical performance such as accelerated attenuation of cyclic capacity and reduction of discharge rate, and may also cause thermal runaway of an electrochemical apparatus to lead to potential safety hazards.

Figure 2:
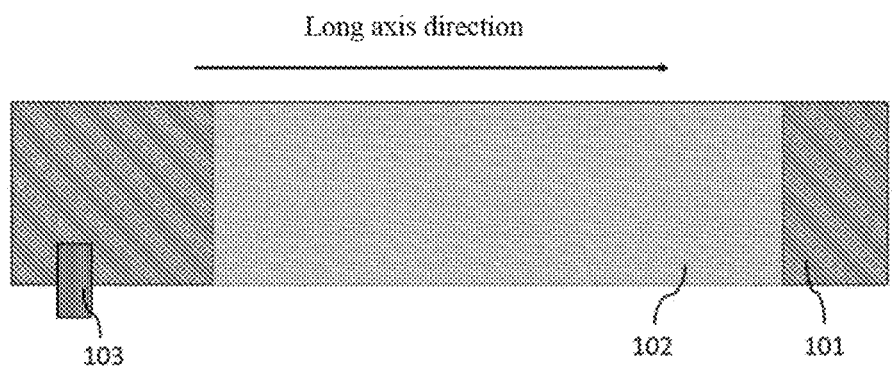
FIG. 2 is a top view of a negative electrode structure according to the prior art.
Figure 3:
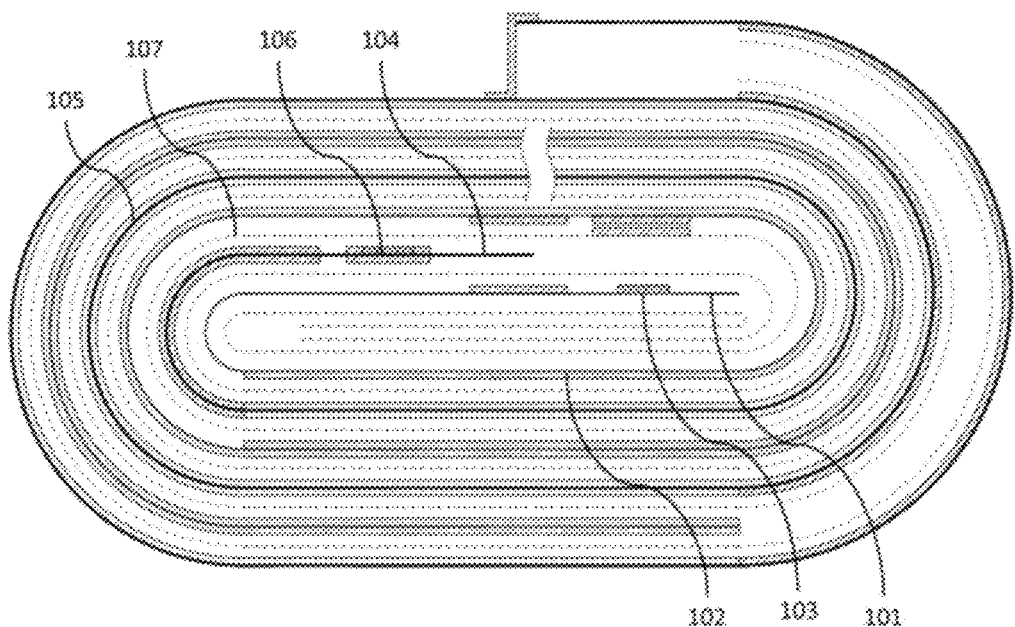
FIG. 3 is a schematic diagram of a winding cell structure according to the prior art.

FIG. 1 and FIG. 2 show a cross-sectional view and a top view of a commercially common negative electrode structure in the prior art. FIG. 3 shows a schematic diagram of a battery cell of a winding structure in the prior art.

As shown in FIG. 1 and FIG. 2, a negative active material layer 102 in the prior art is arranged on a surface of a negative current collector 101, empty foil regions without the negative active material layer 102 are at two ends of the negative current collector 101 in a length direction, and a negative tab 103 is arranged in an uncoated region at one end of the negative current collector. A winding structure after a negative electrode, a positive electrode and a separator 107 are wound to form a battery cell is shown in FIG. 3. In the prior art, the negative tab 103 is arranged in an empty foil region at one end of the negative current collector 101, and a positive tab 106 is arranged in an empty foil region without a positive active material layer 105 at one end of the positive current collector 104, which can ensure that the negative tab 103 and the positive tab 106 are located in the middle of the battery cell during coiling. This design can effectively improve the machinability when an electrochemical apparatus is prepared, and the manufacturing cost is low. However, when a negative active material (for example, a silicon-based material) having a high gram capacity is used, if the silicon-based material content of the negative active material is higher, the conductivity of the negative material layer is lower, resulting in an increase in the internal impedance of the negative electrode and a rise in the heat generating power, thereby reducing the cycle performance of the electrochemical apparatus and causing safety hazard of overheating runaway. In addition, the empty foil regions provided on the positive electrode and the negative electrode reduce the energy density of the electrochemical apparatus.

According to one aspect of this application, this application limits the position of the negative tab and the content of the silicon-based material to reduce the impedance in the negative active material layer, and improves the current density of each part in the negative electrode to reduce the thermal power generated by the internal resistance of the negative electrode during the charging and discharging cycle, thereby improving the cycle performance and safety performance of the electrochemical apparatus.

Figure 4:
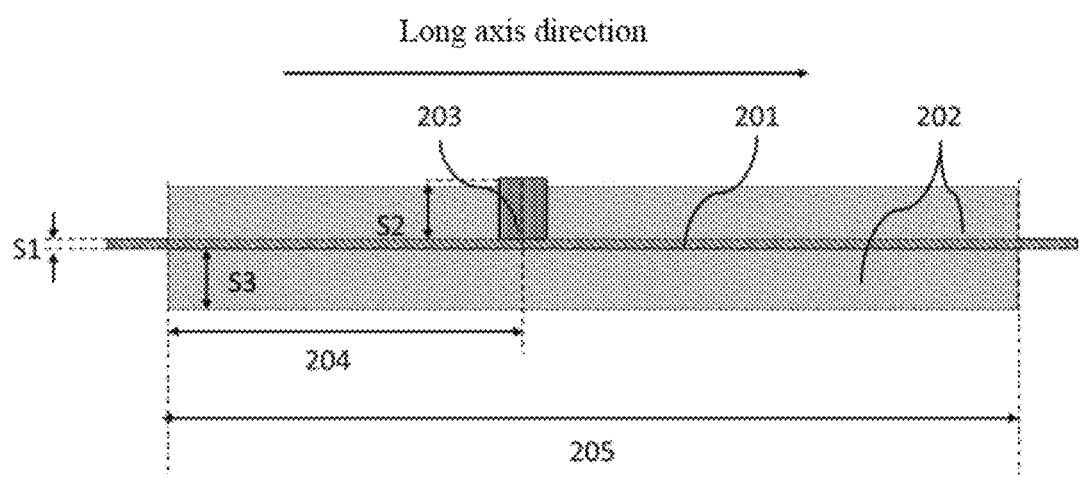
FIG. 4 is a cross-sectional view of a negative electrode structure according to an embodiment of this application.
Figure 5:
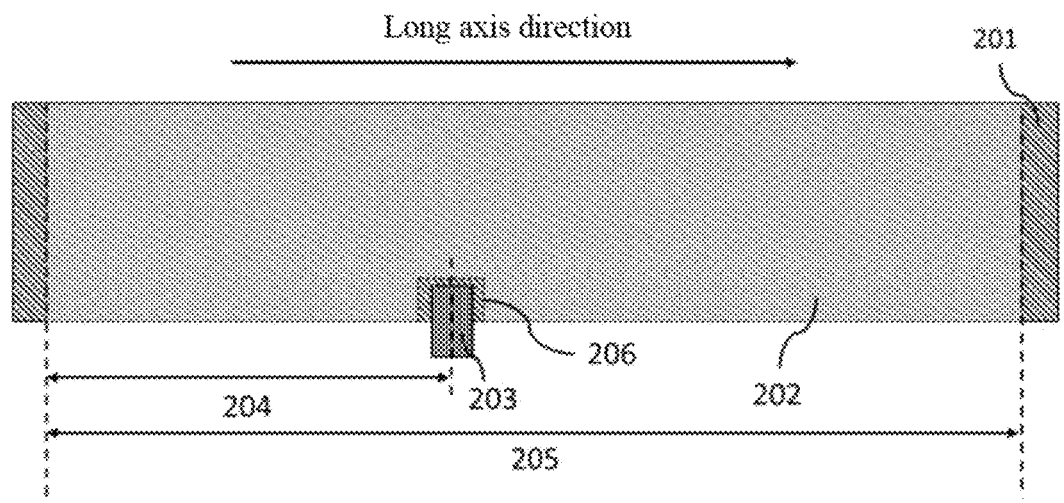
FIG. 5 is a top view of a negative electrode structure according to an embodiment of this application.

FIG. 4 and FIG. 5 show a cross-sectional view and a top view of a negative electrode structure according to some embodiments of this application.

As shown in FIG. 4 and FIG. 5, this application provides a negative electrode, including: a negative current collector 201, a negative active material layer 202, and a negative tab 203. The negative tab 203 is arranged on a side edge of a long axis of the negative current collector 201 and is in contact with the negative active material layer 202. The negative active material layer 202 contains a silicon-based material, a distance between a central position of the negative tab 203 and either end of the negative active material layer 202 in a long axis direction is a first length 204, and a length of a long axis of the negative active material layer is a second length 205. The negative electrode conforms to the following relationship formula (I):

$$0.5 \geq D \geq 0.6 \times G \qquad \text{formula (I)}.$$

D is a ratio of the first length 204 to the second length 205, G is a weight percentage of the silicon-based material in the negative active material layer 202, and the weight percentage G of the silicon-based material is less than or equal to 70%.

An electrochemical apparatus having the negative electrode in accordance with the above relationship formula (I) enables the raising temperature caused by the charging and discharging cycle process during operation to be lower than 15° C. Compared with the prior art, the negative electrode of this application has the advantages that in the charging and discharging cycle process, the conduction distance that a part of current passes through the negative active material layer can be effectively shortened, thereby reducing the internal impedance of the negative electrode itself and the current density of a pole piece region around the negative tab, and reducing the polarization of a battery cell of the negative electrode. In some other embodiments, when the weight percentage G of the silicon-based material is more than 70%, the raising temperature of the electrochemical apparatus caused by the charging and discharging cycle process during operation can still be reduced by putting the central position of the negative tab 203 in the center of the negative active material layer 202 (that is, when the ratio D of the first length 204 to the second length 205 is 0.5).

In some embodiments, as shown in FIG. 4, the negative electrode accords with the following relationship formula (II):

$$0.9 \times (S_1 + 2S_3) \leq S_1 + S_2 \leq 1.1 \times (S_1 + 2S_3) \quad \text{formula (II)}.$$

The thickness of the negative current collector 201 is $S_1$, the thickness of the negative tab 203 is $S_2$, and the thickness of the negative active material layer 202 is $S_3$. Through the above configuration, the thickness of a negative pole piece can be more uniform. When the negative pole piece is wound or stacked to form a battery cell, defects such as bulges or depressions caused by uneven thickness of the pole piece can be avoided, and the structural stability of the battery cell in the cycle process can be improved, thereby improving the safety performance and the cycle performance of the electrochemical apparatus.

In some embodiments, as shown in FIG. 5, the negative active material layer 202 further includes a groove 206, the groove 206 is defined by the negative active material layer 202 and exposes a part of the negative current collector 201, and the negative tab 203 is arranged in the groove. In some other embodiments, an insulating material and/or a bonding material can be arranged in the groove and surround the negative tab 203 to avoid a short circuit caused by the contact between the negative tab and the positive active material layer or the positive tab. It should be understood that the insulating material and the bonding material may be any suitable material common in the art.

Figure 7:
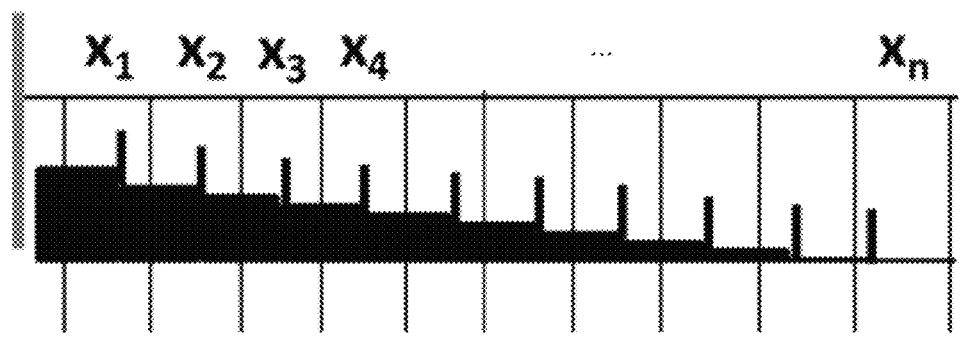
FIG. 7 is a schematic diagram of current distribution when a negative tab is arranged at either end of a long axis of the negative electrode.
Figure 8:
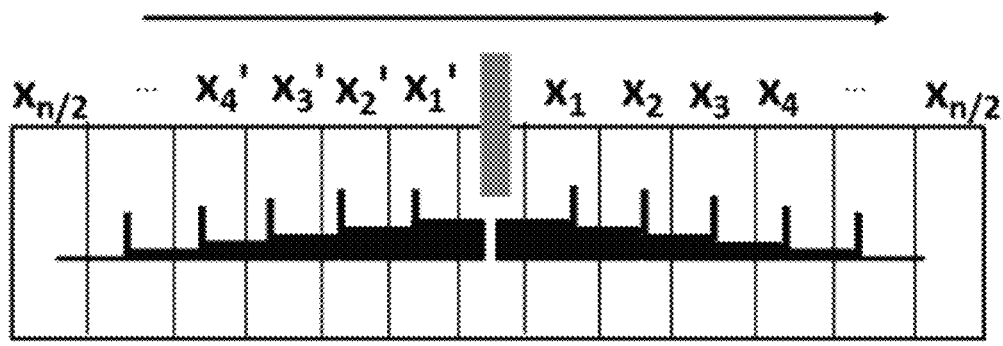
FIG. 8 is a schematic diagram of current distribution when a negative tab is arranged at a middle portion of the long axis of the negative electrode.

FIG. 7 and FIG. 8 are schematic diagrams of current distribution when the negative tab is arranged at either end and a middle portion of the long axis of the negative electrode, respectively.

An ohmic heat Q when current passes through the current collector and a corresponding resistance value R can be calculated for each portion of the negative current collector through the following formulas:

$$Q_i = I_i^2 * R_i * t,$$

$$R_i = \rho * dx / A,$$

where $Q_i$ is a current thermal power of each portion of the negative current collector, $R_i$ is an impedance of each portion of the negative current collector, t is a current circulation time, $\rho$ is a resistivity of the negative current collector, dx is a length of each portion of the negative current collector, and A is a cross-sectional area of the negative current collector. As shown in FIG. 7, when the negative tab is arranged near one end of the current collector, the partial current exported at the portion $X_n$ farthest from the negative tab needs to pass through the portions $X_1$ to $X_n$ of the negative current collector, and the current exported from the portion $X_3$ needs to pass through the portions $X_1$ to $X_3$ of the negative current collector. When the external discharge current is I and the reaction current of each section is Ia, the current passing through the portion $X_1$ of the negative current collector is n*Ia, the current passing through the portion $X_2$ of the negative current collector is (n−1) Ia, the current passing through the portion $X_3$ of the negative current collector is (n−2) Ia, and the current passing through the portion $X_n$ of the negative current collector is Ia.

As shown in FIG. 8, when the negative tab is arranged at the middle portion of the negative current collector, the partial current exported at the portion $X_{n/2}$ farthest from the negative tab only needs to pass through the portions $X_1$ to $X_{n/2}$, and the partial current exported at the other end portion $X_{n/2}'$ also only needs to pass through the portions $X_1'$ to $X_{n/2}'$. Under the same intensity of the discharge current, the negative electrode structure of this application can effectively reduce the intensity of current passing through the negative current collector in the discharge process, thereby reducing the internal impedance of the negative electrode, reducing the overheating temperature rise condition of the negative electrode, and avoiding thermal expansion of the silicon-based material in the negative electrode material.

In some embodiments, the negative current collector 201 may be a copper foil or a nickel foil. However, other negative current collectors commonly used in the art may be used without limitations.

In some embodiments, the thickness of the negative current collector 201 is about 4 μm to 30 μm. In some other embodiments, the thickness of the negative current collector 201 is approximately, for example, about 4.0 μm, about 5.0 μm, about 10.0 μm, about 15.0 μm, about 20.0 μm, about 25.0 μm, or about 30.0 μm, or in a range defined by any two of these values.

The negative active material layer 202 further includes, in addition to the silicon-based material, a negative electrode material capable of absorbing and releasing lithium (Li) (sometimes referred to as a "negative electrode material capable of absorbing/releasing lithium Li" below). Examples of the material capable of absorbing/releasing lithium (Li) may include a carbon material, a metal compound, an oxide, a sulfide, a nitride of lithium such as LiN3, a lithium metal, a metal alloyed with lithium, and a polymer material. In some embodiments, the silicon-based material contains at least one of an elementary substance of silicon, a compound of silicon, an alloy of silicon, and a silica material. In some embodiments, the silica material is a silicon oxide represented by a general formula $SiO_x$, where x is about 0.5 to about 1.5, and the silica material includes a crystalline state, an amorphous state, or a combination thereof.

In some embodiments, the silicon-based material further contains a material layer, the material layer is arranged on at least part of the surface of the silicon-based material, and the material layer contains at least one of a polymer, inorganic particles, amorphous carbon or carbon nano-tubes.

In some embodiments, the inorganic particles include at least one of lithium cobaltate, lithium iron phosphate, lithium nickel cobalt manganate, lithium nickel cobalt aluminate, an elementary substance of silicon, a compound of silicon, an alloy of silicon and a silica material, and the polymer contains at least one of polyvinylidene fluoride, polyacrylic acid, polyvinyl chloride, carboxymethyl cellulose, polyethylene, polypropylene, polyethylene terephthalate, polyimide and aramid.

In some embodiments, based on a total weight of the negative active material layer, the weight percentage G of the silicon-based material in the negative active material layer is more than about 0% and less than or equal to about 70%. In some other embodiments, the weight percentage G of the silicon-based material in the negative active material layer is approximately, for example, about 0%, about 10%, about 20%, about 30%, about 50%, or about 70%, or in a range defined by any two of these values.

In some embodiments, the ratio of the length of the long axis of the negative active material layer to the length of the long axis of the negative current collector is about 0.8 to about 1.0. In some other embodiments, the ratio of the length of the long axis of the negative active material layer to the length of the long axis of the negative current collector is about 0.9 to about 0.95. By eliminating the areas of free regions of the negative active material layer at the two ends of the negative current collector and the area of an empty foil at the negative tab, the utilization rate of the negative current collector can be effectively increased, and the energy density of the electrochemical apparatus can be further improved.

According to another aspect of this application, this application provides an electrochemical apparatus including the negative electrode of this application. In some embodiments, the electrochemical apparatus is a lithium-ion battery. The lithium-ion battery includes a positive electrode, a separator, and the negative electrode of the foregoing embodiment. The separator is arranged between the positive electrode and the negative electrode.

Figure 6:
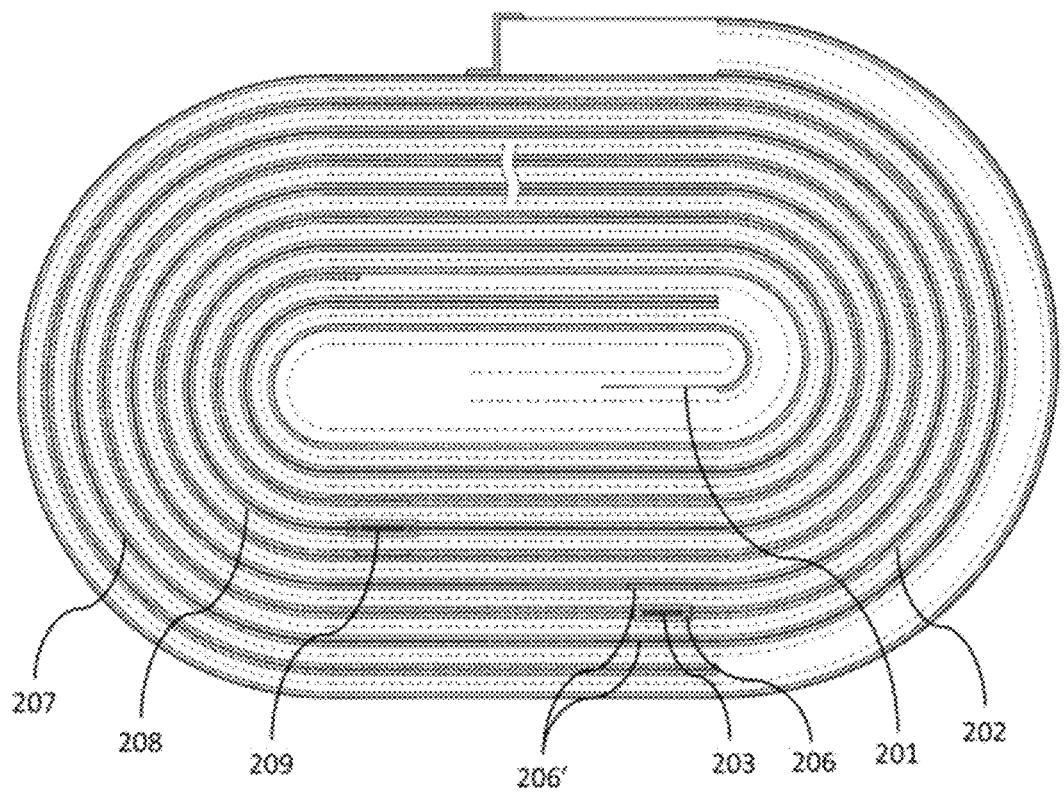
FIG. 6 is a schematic diagram of a winding cell structure according to an embodiment of this application.

FIG. 6 shows a schematic diagram of a battery cell of a winding structure of an electrochemical apparatus according to some embodiments of this application.

As shown in FIG. 6, in some embodiments, the electrochemical apparatus is of a winding structure in which the positive electrode, the negative electrode, and the separator are sequentially stacked and wound, the negative electrode includes a negative current collector 201, a negative active material layer 202 and a negative tab 203, and the negative tab 203 is arranged at a position beyond three layers from the center of the winding structure.

In some embodiments, a positive tab 209 of the positive electrode is arranged at a position one layer inward or outward from the position of the negative tab 203 with respect to the center of the winding structure. The risk of a short circuit between the positive tab 209 and the negative tab 203 can be reduced by arranging the positive tab 209 and the negative tab 203 one layer apart outward.

In some embodiments, the negative tab of this application is arranged on the negative current collector by welding the negative tab to an arrangement position of the negative current collector. The arrangement position is formed by ultrasonically cleaning the negative active material layer, which avoids the problem of watermarks when a positive electrode and a negative electrode of a commercial electrochemical apparatus are coated with positive and negative active material layers. In addition, a welding distance between the arrangement position of the negative current collector and the negative tab can be reduced, which helps to further reduce the impedance at the negative tab.

In some embodiments, as shown in FIG. 6, the negative active material layer 202 and a positive active material layer 208 further include a groove 206, the groove 206 is defined by the negative active material layer 202 or the positive active material layer 208 and exposes a part of the negative current collector 201 or a positive current collector 207, and the groove is arranged around the negative tab 203 or the positive tab 209. In some other embodiments, the groove 206 can be further provided in a region 206' of the positive material layer or the negative material layer corresponding to the negative tab 203 or the positive tab 209. In some other embodiments, an insulating material and/or a bonding material can be arranged in the groove 206 and fill the groove. It should be understood that the insulating material and the bonding material may be any suitable material common in the art. Through the groove, the insulating material and the bonding material, the risk of short circuit of the cell structure can be further reduced.

In some embodiments, the positive electrode further includes a positive current collector 207 and a positive active material layer 208.

In some embodiments, the positive current collector 207 may be an aluminum foil or a nickel foil. However, other materials commonly used in the art may be used as the positive current collector without being limited thereto.

The positive active material layer 208 contains a positive electrode material capable of absorbing and releasing lithium (Li) (sometimes referred to as a "positive electrode material capable of absorbing/releasing lithium Li" below). In some embodiments, the positive electrode material capable of absorbing/releasing lithium (Li) may include one or more of lithium cobaltate, lithium nickel cobalt manganate, lithium nickel cobalt aluminate, lithium manganate, lithium manganese iron phosphate, lithium vanadium phosphate, lithium vanadium phosphate, lithium iron phosphate, lithium titanate, and lithium-rich manganese-based materials.

In the above-mentioned positive electrode material, the chemical formula of the lithium cobaltate may be $Li_yCo_aM1_bO_{2-c}$, where M1 represents at least one selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), stannum (Sn), calcium (Ca), strontium (Sr), tungsten (W), yttrium (Y), lanthanum (La), zirconium (Zr) and silicon (Si), and the values of y, a, b and c are respectively in the following ranges: $0.8 \leq y \leq 1.2$, $0.8 \leq a \leq 1$, $0 \leq b \leq 0.2$, and $-0.1 \leq c \leq 0.2$.

In the above-mentioned positive electrode material, the chemical formula of the lithium nickel cobalt manganate or lithium nickel cobalt aluminate may be $Li_zNi_dM2_eO_{2-f}$, where M2 represents at least one selected from cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), stannum (Sn), calcium (Ca), strontium (Sr), tungsten (W), zirconium (Zr) and silicon (Si), and the values of z, d, e and f are respectively in the following ranges: $0.8 \leq z \leq 1.2$, $0.3 \leq d \leq 0.98$, $0.02 \leq e \leq 0.7$, and $-0.1 \leq f \leq 0.2$.

In the above-mentioned positive electrode material, the chemical formula of the lithium manganate is $Li_uMn_{2-g}M3_gO_{4-h}$, where M3 represents at least one selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), stannum (Sn), calcium (Ca), strontium (Sr) and tungsten (W), and the values of u, g and h are respectively in the following ranges: 0.8≤u≤1.2, 0≤g<1.0, and −0.2≤h≤0.2.

In some embodiments, the positive electrode can further include at least one of a binder and a conductive agent. It should be understood that a person skilled in the art would be able to select conventional binders and conductive agents in the art according to actual requirements without being limited thereto.

In some embodiments, the separator includes, but is not limited to, at least one selected from polyethylene, polypropylene, polyethylene terephthalate, polyimide and aramid. For example, the polyethylene includes at least one component selected from high density polyethylene, low density polyethylene and ultra-high molecular weight polyethylene. In particular, the polyethylene and the polypropylene have a good effect of preventing short circuits, and can improve the stability of the lithium-ion battery by means of a turn-off effect.

The electrochemical apparatus of this application further includes an electrolyte, the electrolyte may be one or more of a gel electrolyte, a solid electrolyte and an electrolyte solution, and the electrolyte solution includes a lithium salt and a non-aqueous solvent.

In some embodiments, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, the lithium salt is selected from $LiPF_6$ because it can give a high ionic conductivity and improve the cycle performance.

The non-aqueous solvent may be a carbonate compound, a carboxylate compound, an ether compound, other organic solvents, or a combination thereof.

The carbonate compound may be a linear carbonate compound, a cyclic carbonate compound, a fluorocarbonate compound, or a combination thereof.

Examples of the other organic solvents are dimethylsulfoxide, 1, 2-dioxolane, sulfolane, methylsulfolane, 1,3-dimethyl-2-imidazolidinone, N-methyl-2-pyrrolidinone, formamide, dimethylformamide, acetonitrile, trimethyl phosphate, triethyl phosphate, trioctyl phosphate, phosphate esters, and combinations thereof.

In some embodiments, the non-aqueous solvent is selected from a group consisting of ethylene carbonate, propylene carbonate, diethyl carbonate, dimethyl carbonate, methyl ethyl carbonate, propylene carbonate, methyl acetate, ethyl propionate, fluoroethylene carbonate, and a combination thereof.

It should be understood that methods for preparing the positive electrode, the negative electrode, the separator and the lithium-ion battery in the embodiments of this application may be any suitable conventional methods in the art without departing from the spirit of this application, and are not limited thereto. In one implementation scheme of the method for manufacturing the electrochemical apparatus, the method for preparing the lithium-ion battery includes: the positive electrode, the separator and the negative electrode in the foregoing embodiment are sequentially wound into a battery cell, the battery cell is filled into, for example, an aluminum-plastic film, the electrolyte is injected, and then the processes of vacuum packaging, standing, forming, shaping and the like are performed to obtain the lithium-ion battery.

The battery cell of the electrochemical apparatus of this application includes not only the winding structure, but also a laminated structure and a folded structure in some embodiments.

Although the lithium-ion battery is illustrated above, a person skilled in the art could conceive that the negative electrode of this application may be used in other suitable electrochemical apparatuses after reading this application. Such electrochemical apparatuses include any apparatus in which an electrochemical reaction takes place. Specific embodiments of the apparatus include all kinds of primary batteries, secondary batteries, fuel batteries, solar batteries, or capacitors. Especially, the electrochemical apparatus is a lithium secondary battery, including a lithium metal secondary battery, a lithium-ion secondary battery, a lithium polymer secondary battery, or a lithium-ion polymer secondary battery.

Some embodiments of this application further provide an electronic apparatus, and the electronic apparatus includes the electrochemical apparatus in the embodiments of this application.

The electronic apparatus according to the embodiments of this application is not particularly limited, and may be any electronic apparatus known in the prior art. In some embodiments, the electronic apparatus may include, but is not limited to, a notebook computer, a pen-input computer, a mobile computer, an electronic book player, a portable telephone, a portable fax machine, a portable copier, a portable printer, a headset, a video recorder, a liquid crystal television, a portable cleaner, a portable CD player, a mini-disc, a transceiver, an electronic notebook, a calculator, a storage card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, and a lithium-ion capacitor.

EXAMPLES

Some examples are listed below, and the electrochemical apparatuses (lithium-ion batteries) therein are respectively subjected to a direct current resistance test, a discharge rate test, a cycle performance test and a cell surface temperature rise test to better describe the technical solution of this application.

I. Test Methods 1.1 Direct Current Resistance Test:

A direct current resistance was calculated by using the following formula, $R=(U_{0.1C}-U_{1C})/(I_{1C}-I_{0.1C})$, where R was the direct current resistance, $I_{1C}$ was a current of the lithium-ion battery with a discharge rate of 1 C, $I_{0.1C}$ was a current of the lithium-ion battery with a discharge rate of 0.1 C, $U_{1C}$ was a terminal voltage of the lithium-ion battery after discharging for 1 second at the discharge rate of 1 C, and $U_{0.1C}$ was a terminal voltage of the lithium-ion battery after discharging for 10 seconds at the discharge rate of 0.1 C. direct current resistance test process: after the lithium-ion battery of the following examples was fully charged, the lithium-ion battery was discharged for 10 seconds at a constant current of 0.1 C, the current $I_{0.1C}$ and the terminal voltage $U_{0.1C}$ were recorded, then the lithium-ion battery was discharged for 1 second at a constant current of 1 C, and the current $I_{1C}$ and the terminal voltage $U_{1C}$ were recorded. Four lithium-ion batteries in each group were tested, and an average value of the direct current resistances of the lithium-ion batteries was calculated.

1.2 Discharge Rate Test:

The lithium-ion battery of the following examples was stood in an incubator of 25° C.±2° C. for 2 hours, charged to 4.35 V at a constant current of 0.5 C, then charged to 0.05 C at the constant voltage of 4.35 V, stood for 15 minutes, and discharged to 3.0 V at a constant current of 0.2 C. Subsequently, the lithium-ion battery was charged to 4.35 V at the constant current of 0.5 C, then fully charged to 0.05 C at the constant voltage of 4.35V, and discharged to 3.0 V at the constant current of 1.0 C. The discharge capacities of the lithium-ion battery discharged at the constant currents of 0.2 C and 1.0 C were recorded.

Four lithium-ion batteries in each group were tested, and an average value of the discharge rates of the lithium-ion batteries was calculated. Discharge rate=discharge capacity of 1.0 C constant current discharge (mAh)/discharge capacity of 0.2 C constant current discharge (mAh).

1.3 Cycle Performance Test:

The lithium-ion battery of the following examples was stood in the incubator of 25° C.±2° C. for 2 hours, charged to 4.35 V at the constant current of 0.5 C, then charged to 0.05 C at the constant voltage of 4.35 V, stood for 15 minutes, and discharged to 3.0 V at the constant current of 0.5 C. This was a charging and discharging cycle process. The discharge capacity of the first cycle of the lithium-ion battery was recorded, the charging and discharging cycle process was repeated multiple times according to the above method, and the discharge capacity after 100 cycles was recorded.

Four lithium-ion batteries in each group were tested, and an average value of the capacity retention rates of the lithium-ion batteries was calculated. Capacity retention rate of 100 cycles of the lithium-ion battery=discharge capacity at the $100^{th}$ cycle (mAh)/discharge capacity after the first cycle (mAh)×100%.

1.4 Cell Surface Temperature Rise Test:

The lithium-ion battery of the following examples was placed in the sealed incubator of 25° C.±2° C., and temperatures at four different positions on the cell surface of the lithium-ion battery were monitored. A specific temperature rise test process was: the lithium-ion battery was first discharged to 2.8 V at the constant current of 1.0 C and stood for 30 minutes. Then, the lithium-ion battery was charged to 4.35 V at the constant current of 1.0 C, stood for 5 minutes, and discharged to 2.8 V at the constant current of 1.0 C. This was a charging and discharging cycle process. The charging and discharging cycle process was repeated three times. An average value of cell surface temperature rises of the lithium-ion batteries was calculated.

II. Preparation Method 2.1 Preparation of a Positive Electrode

Lithium cobaltate, acetylene black and polyvinylidene fluoride in a weight percentage of 94:3:3 were dissolved in an N-methyl pyrrolidone (NMP) solution to form a positive slurry. An aluminum foil was used as a positive current collector, the positive slurry was coated on the positive current collector, and the positive electrode was obtained after drying, cold pressing and cutting.

2.2 Preparation of a Separator

Polyvinylidene fluoride was dissolved in water to form a uniform slurry by mechanical stirring, the slurry was coated on two side surfaces of a porous base material (polyethylene) coated with ceramic coatings on both sides, and the separator was formed after drying.

2.3 Preparation of an Electrolyte

In an environment that the water content was less than 10 ppm, lithium hexafluorophosphate was mixed with non-aqueous organic solvents (ethylene carbonate (EC):diethyl carbonate (DEC):propylene carbonate (PC):propyl propionate (PP):vinylene carbonate (VC)=20:30:20:28:2, weight percentage) in a weight percentage of 8:92 to form the electrolyte.

Example 1-1

Artificial graphite and elementary silicon in a certain weight percentage were uniformly dispersed in deionized water to form a negative slurry. A copper foil was used as a negative current collector having a thickness of 8 μm, 105 mg of the negative slurry was coated on the negative current collector, and a negative tab having a thickness of 80 μm was arranged at one end of the negative current collector in the long axis direction after drying, cold pressing and cutting to obtain a negative electrode. The weight percentage of the elementary silicon in the negative active material layer was 20%. The positive electrode, the separator and the negative electrode were stacked in sequence with the separator located between the positive electrode and the negative electrode to play an isolating role, and then wound into a battery cell with 7 layers (double-sided positive and negative electrodes were counted as one layer). Subsequently, the battery cell was packaged in an aluminum-plastic film packaging bag, and dehydrated at 80° C. to obtain a dry cell. Then, the electrolyte was injected into the dry cell, and a lithium-ion battery was obtained by vacuum packaging, standing, forming, shaping and the like.

Example 1-2

The preparation method was the same as that in Example 1-1, except that in Example 1-2, the artificial graphite and silicon carbon were mixed and dissolved in deionized water to form a negative slurry, and the weight percentage of the silicon carbon in the negative active material layer was 40%.

Example 1-3

The preparation method was the same as that in Example 1-1, except that in Example 1-3, the artificial graphite and silicon carbon were mixed and dissolved in deionized water to form a negative slurry, and the weight percentage of the silicon carbon in the negative active material layer was 50%.

Example 1-4

The preparation method was the same as that in Example 1-1, except that in Example 1-4, the artificial graphite and silicon carbon were mixed and dissolved in deionized water to form a negative slurry, and the weight percentage of the silicon carbon in the negative active material layer was 70%.

Example 1-5

The preparation method was the same as that in Example 1-5, the artificial graphite and silicon carbon were mixed and dissolved in deionized water to form a negative slurry, and the weight percentage of the silicon carbon in the negative active material layer was 90%.

Examples 2-1 to 2-5

The preparation method was the same as that in Example 1-1, except that in Examples 2-1 to 2-5, a distance between an arrangement position of the negative tab and the closest end of the negative active material layer in the long axis direction was 0.125 times the length of the long axis of the negative active material layer, and the positive tab was arranged at a position one layer outward from the position of the negative tab with respect to the center of the winding structure. In Examples 2-1 to 2-5, the negative active material included artificial graphite and silicon carbon, and the weight percentages of the silicon carbon in the negative active material layer were 20%, 40%, 50%, 70% and 90%, respectively.

Examples 3-1 to 3-5

The preparation method was the same as that in Example 1-1, except that in Examples 3-1 to 3-5, the distance between the arrangement position of the negative tab and the closest end of the negative active material layer in the long axis direction was 0.25 times the length of the long axis of the negative active material layer, and the positive tab was arranged at a position one layer outward from the position of the negative tab with respect to the center of the winding structure. In Examples 3-1 to 3-5, the negative active material included artificial graphite and silicon carbon, and the weight percentages of the silicon carbon in the negative active material layer were 20%, 40%, 50%, 70% and 90%, respectively.

Examples 4-1 to 4-5

The preparation method was the same as that in Example 1-1, except that in Examples 4-1 to 4-5, the distance between the arrangement position of the negative tab and the closest end of the negative active material layer in the long axis direction was 0.5 times the length of the long axis of the negative active material layer, and the positive tab is arranged at a position one layer outward from the position of the negative tab with respect to the center of the winding structure. In Examples 4-1 to 4-5, the negative active material included artificial graphite and silicon carbon, and the weight percentages of the silicon carbon in the negative active material layer were 20%, 40%, 50%, 70% and 90%, respectively.

Examples 5-1 and 5-2

The preparation method was the same as that in Example 1-1, except that in Examples 5-1 and 5-2, the distances between the arrangement position of the negative tab and the closest end of the negative active material layer in the long axis direction were respectively 0.1 and 0.15 times the length of the long axis of the negative active material layer, the coating thicknesses of the negative active material layer coated on the negative current collector were 35 µm and 45 µm, and the positive tab was arranged at a position one layer outward from the position of the negative tab with respect to the center of the winding structure. In Examples 5-1 and 5-2, the negative active material included artificial graphite and silicon carbon, and the weight percentage of the silicon carbon in the negative active material layer was 20%.

Examples 5-3 and 5-4

The preparation method was the same as that in Example 1-1, except that in Examples 5-3 and 5-4, the distance between the arrangement position of the negative tab and the closest end of the negative active material layer in the long axis direction was 0.125 times the length of the long axis of the negative active material layer, and the positive tab is arranged at a position one layer outward from the position of the negative tab with respect to the center of the winding structure. The thicknesses of the negative current collector in Examples 5-3 and 5-4 were respectively 4 µm and 30 µm, and the weight percentage of the silicon carbon in the negative active material layer in Examples 5-3 and 5-4 was 20%.

The lithium-ion batteries of the above examples were subjected to a direct current resistance test, a discharge rate test, a cycle performance test and a cell surface temperature rise test, and test results were recorded.

The results of the direct current resistance test, the discharge rate test, the cycle performance test and the cell surface temperature rise test on the lithium-ion batteries of all the examples were shown in Tables 1 to 5 below.

TABLE 1

| Example | Ratio of the distance between the negative tab and the closest end of the negative active material layer to the length of the long axis of the negative active material layer | Weight percentage (%) of silicon-based material | Coating thickness of negative active material (µm) | Thickness of current collector (µm) | Direct current resistance (mΩ) | Discharge rate | Capacity retention rate after 100 cycles | Average temperature rise of cell surface (° C.) |
|---|---|---|---|---|---|---|---|---|
| Example 1-1 | 0 | 20 | 40 | 8 | 27.5 | 89.1% | 86.2% | 16.4 |
| Example 1-2 | 0 | 40 | 40 | 8 | 37.1 | 87.6% | 83.9% | 21.9 |
| Example 1-3 | 0 | 50 | 40 | 8 | 43.7 | 85.3% | 79.4% | 27.3 |
| Example 1-4 | 0 | 70 | 40 | 8 | 58.9 | 77.8% | 65.5% | 34.5 |
| Example 1-5 | 0 | 90 | 40 | 8 | 70.2 | 74.3% | 60.9% | 42.1 |

TABLE 2

| Example | Ratio of the distance between the negative tab and the closest end of the negative active material layer to the length of the long axis of the negative active material layer | Weight percentage (%) of silicon-based material | Coating thickness of negative active material (µm) | Thickness of current collector (µm) | Direct current resistance (mΩ) | Discharge rate | Capacity retention rate after 100 cycles | Average temperature rise of cell surface (° C.) |
|---|---|---|---|---|---|---|---|---|
| Example 2-1 | 0.125 | 20 | 40 | 8 | 26.4 | 89.8% | 86.8% | 14.3 |
| Example 2-2 | 0.125 | 40 | 40 | 8 | 35.9 | 88.7% | 84.6% | 19.8 |
| Example 2-3 | 0.125 | 50 | 40 | 8 | 42.4 | 86.1% | 82.3% | 24.5 |
| Example 2-4 | 0.125 | 70 | 40 | 8 | 54.8 | 80.5% | 75.2% | 31.9 |
| Example 2-5 | 0.125 | 90 | 40 | 8 | 66.2 | 75.4% | 69.9% | 39.1 |

TABLE 3

| Example | Ratio of the distance between the negative tab and the closest end of the negative active material layer to the length of the long axis of the negative active material layer | Weight percentage (%) of silicon-based material | Coating thickness of negative active material (μm) | Thickness of current collector (μm) | Direct current resistance (mΩ) | Discharge rate | Capacity retention rate after 100 cycles | Average temperature rise of cell surface (° C.) |
|---|---|---|---|---|---|---|---|---|
| Example 3-1 | 0.25 | 20 | 40 | 8 | 26.4 | 92.3% | 87.4% | 10.3 |
| Example 3-2 | 0.25 | 40 | 40 | 8 | 34.1 | 90.6% | 85.4% | 14.7 |
| Example 3-3 | 0.25 | 50 | 40 | 8 | 40.7 | 89.2% | 84.5% | 18.2 |
| Example 3-4 | 0.25 | 70 | 40 | 8 | 47.8 | 87.7% | 87.3% | 24.9 |
| Example 3-5 | 0.25 | 90 | 40 | 8 | 54.4 | 80.8% | 82.9% | 30.8 |

TABLE 4

| Example | Ratio of the distance between the negative tab and the closest end of the negative active material layer to the length of the long axis of the negative active material layer | Weight percentage (%) of silicon-based material | Coating thickness of negative active material (μm) | Thickness of current collector (μm) | Direct current resistance (mΩ) | Discharge rate | Capacity retention rate after 100 cycles | Average temperature rise of cell surface (° C.) |
|---|---|---|---|---|---|---|---|---|
| Example 4-1 | 0.5 | 20 | 40 | 8 | 17.3 | 95.5% | 89.9% | 8.4 |
| Example 4-2 | 0.5 | 40 | 40 | 8 | 25.1 | 92.1% | 89.2% | 10.6 |
| Example 4-3 | 0.5 | 50 | 40 | 8 | 33.7 | 91.8% | 87.9% | 11.9 |
| Example 4-4 | 0.5 | 70 | 40 | 8 | 39.9 | 90.5% | 87.0% | 14.6 |
| Example 4-5 | 0.5 | 90 | 40 | 8 | 47.2 | 86.3% | 86.5% | 19.1 |

TABLE 5

| Example | Ratio of the distance between the negative tab and the closest end of the negative active material layer to the length of the long axis of the negative active materiel layer | Weight percentage (%) of silicon-based material | Single coating thickness of negative active material (μm) | Thickness of current collector (μm) | Direct current resistance (mΩ) | Discharge rate | Capacity retention rate after 100 cycles | Average temperature rise of cell surface (° C.) |
|---|---|---|---|---|---|---|---|---|
| Example 5-1 | 0.1 | 20 | 35 | 8 | 25.1 | 90.4% | 88.0% | 14.6 |
| Example 5-2 | 0.15 | 20 | 45 | 8 | 27.1 | 90.1% | 86.3% | 14.8 |
| Example 5-3 | 0.125 | 20 | 40 | 4 | 30.9 | 89.1% | 85.7% | 16.7 |
| Example 5-4 | 0.125 | 20 | 40 | 30 | 14.1 | 93.6% | 91.5% | 6.3 |

Figure 9:
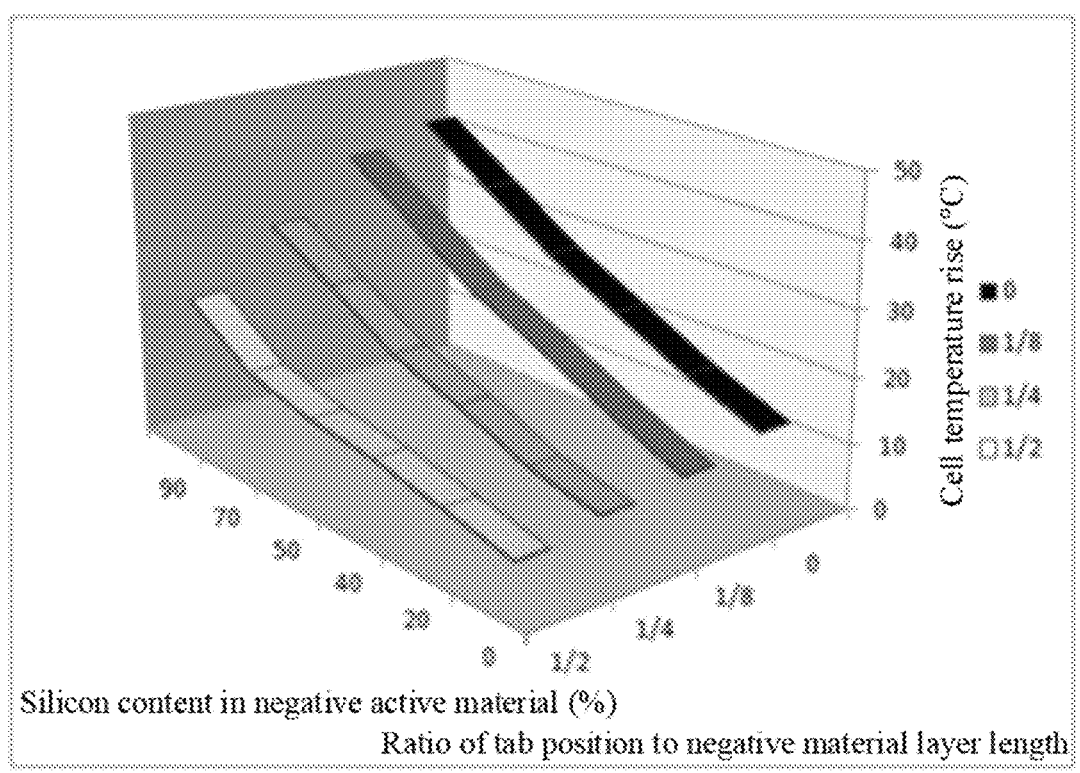
FIG. 9 is a three-dimensional curve chart of the arrangement position of negative tab, silicon-based material content in a negative active material layer, and battery cell temperature rise according to the embodiments of this application.

FIG. 9 is a three-dimensional curve chart showing the arrangement position of the negative tab, the silicon content in the negative active material layer, and the temperature rise of the battery cell in the examples of Tables 1 to 4 of this application. As shown in FIG. 9, the examples of this application obviously show the influence of the arrangement position of the negative tab and the silicon content on the cycle performance and safety performance of the electrochemical apparatus. According to the results of Table 1, the ratio D of the distance between the center of the negative tab and either end of the negative active material layer in the long axis direction to the length of the long axis of the negative active material layer and the weight percentage G of silicon in the negative active material layer in Examples 1-1, 2-1, 2-2, 3-1, 3-2, 3-3, 4-1, 4-2, 4-3 and 4-4 complied with the following relationship formula: D≥0.6×G. It can be seen from the examples that the electrochemical apparatus according to the examples of this application can effectively reduce the raising temperature of the battery cell during the charging and discharging cycle process to be less than 15° C.

According to Examples 5-1 to 5-4, when the thickness of the tab was 80 μm, the thickness $S_1$ of the negative current collector, the thickness $S_2$ of the negative tab, and the thickness $S_3$ of the negative active material layer satisfied the following relationship formula: $0.9(S_1+2S_3) \leq S_1+S_2 \leq 1.1(S_1+2S_3)$. The temperature rise of the battery cell decreases with the increase of the thickness of the negative current collector. Considering the strength of the current collector and the energy density of the battery cell, the 8 μm current collector is preferred among the examples. By controlling the relationship between the arrangement position of the negative tab and the silicon content, in the case of the negative electrode material with the same silicon content, the electrochemical apparatus provided by the examples of this application can have lower direct current resistance and better discharge rate, and also shows better cycle capacity. In addition, the examples conforming to the relationship between the arrangement position of the negative tab and the silicon content in the examples of this application can effectively control the average temperature rise of the cell surface, thereby ensuring the safety performance of the electrochemical apparatus.

Through the comparison of the above examples, it can be clearly understood that the cycle performance and safety performance of the electrochemical apparatus of this application can be significantly improved by limiting the relationship between the arrangement position of the negative tab and the weight percentage of silicon in the negative active material layer.

References to "some embodiments", "other embodiments", "an embodiment", "another example", "examples", "specific examples", or "some examples" in the specification mean the inclusion of specific features, structures, materials, or characteristics described in the embodiment or embodiment in at least one embodiment or embodiment of the application. Accordingly, descriptions appearing in the specification, such as "in some embodiments", "in the embodiments", "in an embodiment", "in another example", "in an example". "in a particular example", or "for example", are not necessarily references to the same embodiments or examples in the application. In addition, specific features, structures, materials, or characteristics herein may be incorporated in any suitable manner into one or more embodiments or examples.

Although illustrative embodiments have been demonstrated and described, those skilled in the art should understand that the above embodiments are not to be construed as limiting the application, and that the embodiments may be changed, replaced, and modified without departing from the spirit, principle, and scope of the application.

What is claimed is:

1. An electrochemical apparatus, comprising:
   a positive electrode;
   a separator; and
   a negative electrode;
   wherein the negative electrode comprises
   a negative current collector;
   a negative active material layer, wherein the negative active material layer contains a silicon-based material; and
   a negative tab,
   wherein the negative tab is arranged on a side edge of a long axis of the negative current collector, a distance between a central position of the negative tab and either end of the negative active material layer in a long axis direction is a first length, a length of a long axis of the negative active material layer is a second length, and the negative electrode satisfies the following relationship formula (I):

$$0.5 \geq D \geq 0.6 \times G \quad \text{formula (I)}$$

wherein D is a ratio of the first length to the second length, G is a weight percentage of the silicon-based material, and the weight percentage of the silicon-based material is less than or equal to 70%.

2. The electrochemical apparatus according to claim 1, wherein the negative electrode satisfies the following relationship formula (II):

$$0.9 \times (S_1 + 2S_3) \leq S_1 + S_2 \leq 1.1 \times (S_1 + 2S_3) \quad \text{formula (II)}$$

wherein $S_1$ is a thickness of the negative current collector, $S_2$ is a thickness of the negative tab, and $S_3$ is a thickness of the negative active material layer, and wherein the thickness $S_1$ of the negative current collector is 4 μm to 30 μm.

3. The electrochemical apparatus according to claim 1, wherein the silicon-based material contains at least one of an elementary substance of silicon, a compound of silicon, an alloy of silicon, or a silica material.

4. The electrochemical apparatus according to claim 1, wherein a ratio of the second length to a length of the long axis of the negative current collector is 0.8 to 1.0.

5. The electrochemical apparatus according to claim 1, wherein the electrochemical apparatus is of a winding structure, and the negative tab is arranged at a position beyond three layers from a center of the winding structure.

6. The electrochemical apparatus according to claim 5, wherein a positive tab of the positive electrode is arranged at a position one layer outward from the position of the negative tab with respect to the center of the winding structure.

7. The electrochemical apparatus according to claim 1, wherein the silicon-based material further contains a material layer, the material layer is arranged on at least a part of a surface of the silicon-based material, and the material layer contains at least one of a polymer, inorganic particles, amorphous carbon or carbon nanotubes.

8. The electrochemical apparatus according to claim 7, wherein the inorganic particles comprise at least one of lithium cobaltate, lithium iron phosphate, lithium nickel cobalt manganate, lithium nickel cobalt aluminate, an elementary substance of silicon, a compound of silicon, an alloy of silicon, or a silica material; and the polymer contains at least one of polyvinylidene fluoride, polyacrylic acid, polyvinyl chloride, carboxymethyl cellulose, polyethylene, polypropylene, polyethylene terephthalate, polyimide, or aramid.

9. The electrochemical apparatus according to claim 1, wherein the negative electrode is provided with a groove, and the negative tab is arranged in the groove.

10. An electronic apparatus, comprising an electrochemical apparatus, wherein the electrochemical apparatus comprises:
    a positive electrode;
    a separator; and
    a negative electrode,
    wherein the negative electrode comprises:
    a negative current collector;
    a negative active material layer, wherein the negative active material layer contains a silicon-based material; and
    a negative tab,
    wherein the negative tab is arranged on a side edge of a long axis of the negative current collector, a distance between a central position of the negative tab and either end of the negative active material layer in a long axis direction is a first length, a length of a long axis of the negative active material layer is a second length, and the negative electrode satisfies the following relationship formula (I):

$$0.5 \geq D \geq 0.6 \times G \quad \text{formula (I)}$$

wherein D is a ratio of the first length to the second length, G is a weight percentage of the silicon-based material, and the weight percentage of the silicon-based material is less than or equal to 70%.

11. The electronic apparatus according to claim 10, wherein the negative electrode satisfies the following relationship formula (II):

$$0.9 \times (S_1 + 2S_3) \leq S_1 + S_2 \leq 1.1 \times (S_1 + 2S_3) \quad \text{formula (II)}$$

wherein $S_1$ is a thickness of the negative current collector, $S_2$ is a thickness of the negative tab, and $S_3$ is a thickness of the negative active material layer, and wherein the thickness $S_1$ of the negative current collector is 4 μm to 30 μm.

12. The electronic apparatus according to claim 10, wherein the silicon-based material contains at least one of: an elementary substance of silicon, a compound of silicon, or an alloy of silicon.

13. The electronic apparatus according to claim 10, wherein a ratio of the second length to a length of the long axis of the negative current collector is 0.8 to 1.0.

14. The electronic apparatus according to claim 10, wherein the electrochemical apparatus is of a winding structure, and the negative tab is arranged at a position beyond three layers from a center of the winding structure.

* * * * *